US010552048B2

United States Patent
Um et al.

(10) Patent No.: US 10,552,048 B2
(45) Date of Patent: Feb. 4, 2020

(54) REDUCTION OF MAXIMUM LATENCY USING DYNAMIC SELF-TUNING FOR REDUNDANT ARRAY OF INDEPENDENT DISKS

(71) Applicant: SK hynix Inc., Gyeonggi-do OT (KR)

(72) Inventors: Tae Il Um, San Jose, CA (US); In Gu Kang, Seoul (KR); Mehryar Rahmatian, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/153,571

(22) Filed: May 12, 2016

(65) Prior Publication Data

US 2016/0334999 A1 Nov. 17, 2016

Related U.S. Application Data (60) Provisional application No. 62/160,508, filed on May 12, 2015.

(51) Int. Cl.
*G06F 3/06* (2006.01)
*G06F 12/02* (2006.01)

(52) U.S. Cl.
CPC .......... *G06F 3/0611* (2013.01); *G06F 3/0616* (2013.01); *G06F 3/0619* (2013.01); *G06F 3/0653* (2013.01); *G06F 3/0659* (2013.01); *G06F 3/0688* (2013.01); *G06F 3/0689* (2013.01); *G06F 12/0246* (2013.01); *G06F 2212/7201* (2013.01); *G06F 2212/7205* (2013.01); *G06F 2212/7211* (2013.01)

(58) Field of Classification Search
CPC ............... G06F 11/1076; G06F 11/108; G06F 11/1084; G06F 2211/1002; G06F 3/0611; G06F 3/0688; G06F 3/0689; G06F 12/0246; G06F 2212/7208
See application file for complete search history.

(56) References Cited

U.S. PATENT DOCUMENTS

| | | | |
|---|---|---|---|
| 8,074,021 B1 * | 12/2011 | Miller | G06F 11/108 710/22 |
| 8,621,146 B1 | 12/2013 | Miller et al. | |
| 9,128,910 B1 * | 9/2015 | Dayal | G06F 11/22 |
| 2002/0032882 A1 * | 3/2002 | Mann | G06F 11/1076 714/6.11 |
| 2003/0016596 A1 * | 1/2003 | Chiquoine | G06F 11/1076 369/34.01 |
| 2003/0212858 A1 * | 11/2003 | Apperley | G06F 11/1076 711/114 |
| 2006/0026347 A1 * | 2/2006 | Hung | G06F 11/1076 711/114 |

(Continued)

*Primary Examiner* — Edward J Dudek, Jr.
*Assistant Examiner* — Andrew Russell
(74) *Attorney, Agent, or Firm* — IP & T Group LLP (57) ABSTRACT

Memory systems may include a redundant array of independent disks (RAID) group including a plurality of disks, and a storage access layer including a RAID engine suitable for requesting data from the RAID group, determining whether a disk in the plurality of disks is busy based on a latency threshold, when the disk is determined to be busy, determining whether the requested data can be obtained from other non-busy disks in the plurality of disks, and obtaining the requested data when the data is determined to be obtainable from the other non-busy disks.

6 Claims, 5 Drawing Sheets

(56) References Cited

U.S. PATENT DOCUMENTS

| | | | |
|---|---|---|---|
| 2007/0115731 A1* | 5/2007 | Hung | G06F 11/1076 |
| | | | 365/189.05 |
| 2009/0106602 A1* | 4/2009 | Piszczek | G06F 11/008 |
| | | | 714/42 |
| 2009/0292861 A1* | 11/2009 | Kanevsky | G06F 3/061 |
| | | | 711/103 |
| 2012/0066449 A1* | 3/2012 | Colgrove | G06F 3/061 |
| | | | 711/114 |
| 2013/0117525 A1* | 5/2013 | Jess | G06F 3/0611 |
| | | | 711/171 |
| 2015/0019918 A1* | 1/2015 | Li | G06F 11/108 |
| | | | 714/54 |
| 2015/0161043 A1* | 6/2015 | Tsuchiyama | G06F 12/0253 |
| | | | 711/102 |
| 2015/0324135 A1* | 11/2015 | Chan | G06F 3/061 |
| | | | 711/114 |

* cited by examiner

REDUCTION OF MAXIMUM LATENCY USING DYNAMIC SELF-TUNING FOR REDUNDANT ARRAY OF INDEPENDENT DISKS

CROSS-REFERENCE TO RELATED APPLICATIONS

This application claims the benefit of U.S. Provisional Application No. 62/160,508 filed May 12, 2015, the entire contents of which are incorporated herein by reference.

BACKGROUND

1. Field

Exemplary embodiments of the present disclosure relate to a memory system and an operating method thereof.

2. Description of the Related Art

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Aspects of the invention include memory systems. The memory systems may include a redundant array of inexpensive disks (RAID) group including a plurality of disks, and a storage access layer including a RAID engine suitable for requesting data from the RAID group, determining whether a disk in the plurality of disks is busy based on a latency threshold, when the disk is determined to be busy, determining whether the requested data can be obtained from other non-busy disks in the plurality of disks, and obtaining the requested data when the data is determined to be obtainable from the other non-busy disks.

Further aspects of the invention include methods. The methods may include requesting, with a redundant array of inexpensive disks (RAID) engine, data from a RAID group, the RAID group including a plurality of disks, determining whether a disk in the plurality of disks is busy based on a latency threshold, when the disk is determined to be busy, determining whether the requested data can be obtained from other non-busy disks in the plurality of disks, and obtaining the requested data when the data is determined to be obtainable from the other non-busy disks.

Additional aspects of the invention include memory devices. The memory devices may include a redundant array of inexpensive disks (RAID) group including a plurality of disks, and a RAID engine configured to request data from the RAID group, determine whether a disk in the plurality of disks is busy based on a latency threshold, and obtain the requested data from other non-busy disks when the disk is determined to be busy.

DETAILED DESCRIPTION

Various embodiments will be described below in more detail with reference to the accompanying drawings. The present invention may, however be embodied in different forms and should not be construed as limited to the embodiments set forth herein. Rather these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
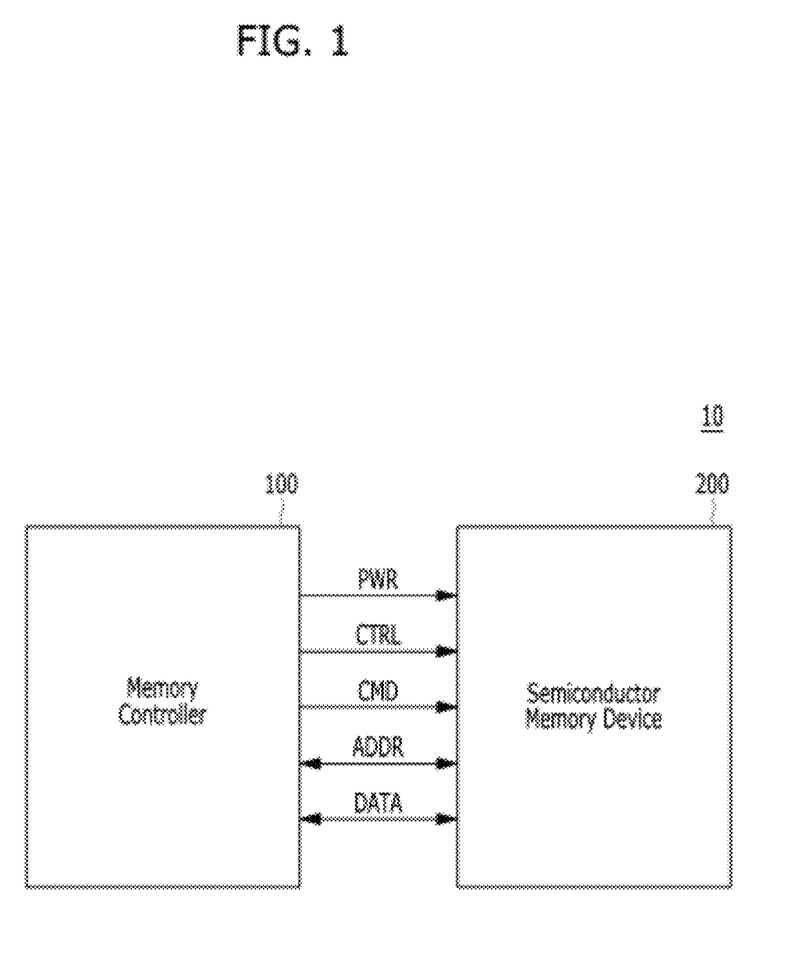
FIG. 1 is a block diagram schematically illustrating a memory system in accordance with an embodiment of the present invention.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
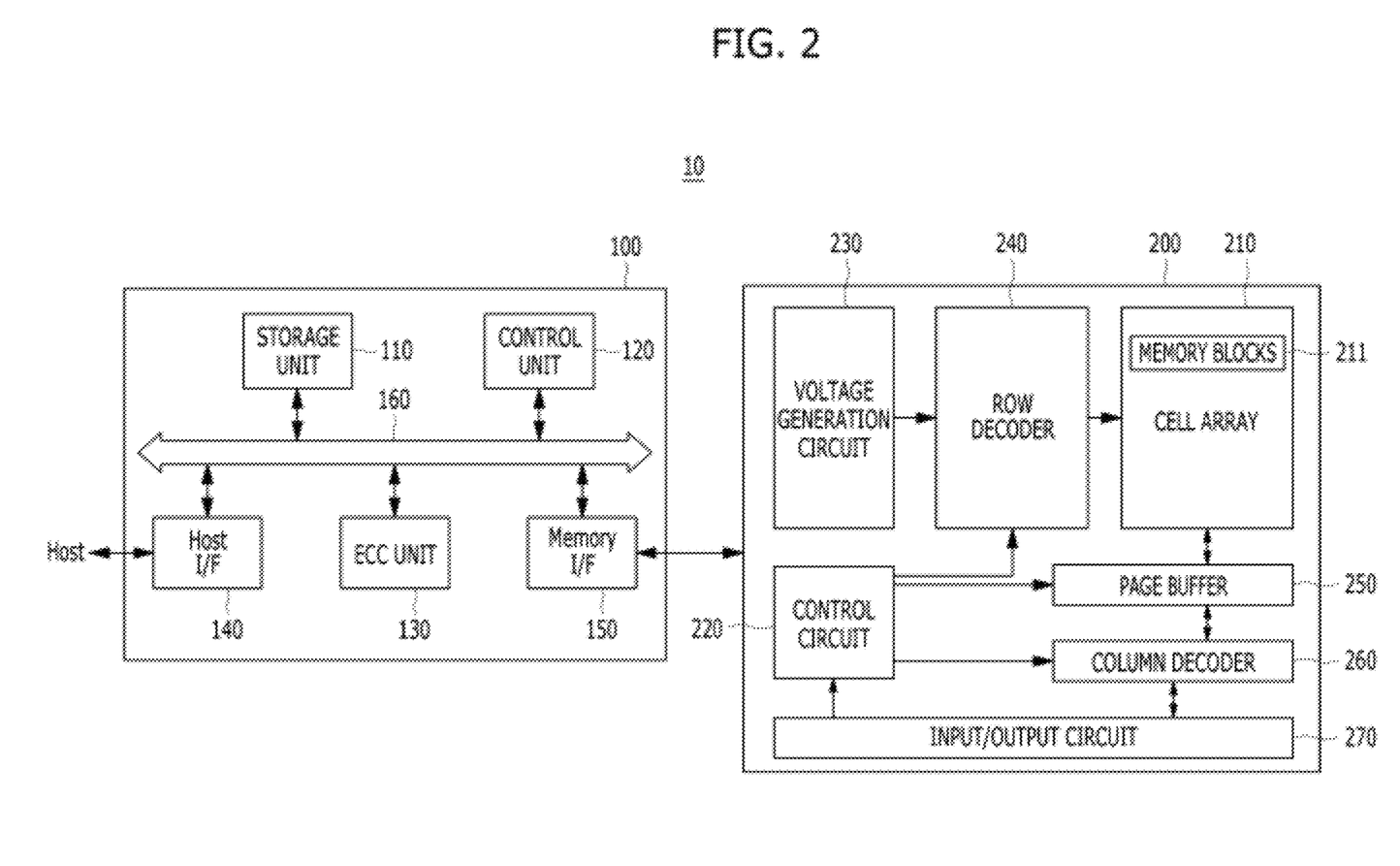
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture pager, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM) a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (PRAM).

The controller 100 may control storage of data in tie memory device 200. For example, the controller 100 may control the memory device 200 in response to a request from the host device. The controller 100 may provide the data read from the memory device 200, to the host device, and store the data provided from the host device into the memory device 200.

The controller 100 may include a storage unit 110, a control unit 120, the error correction code (EEC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include a I circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
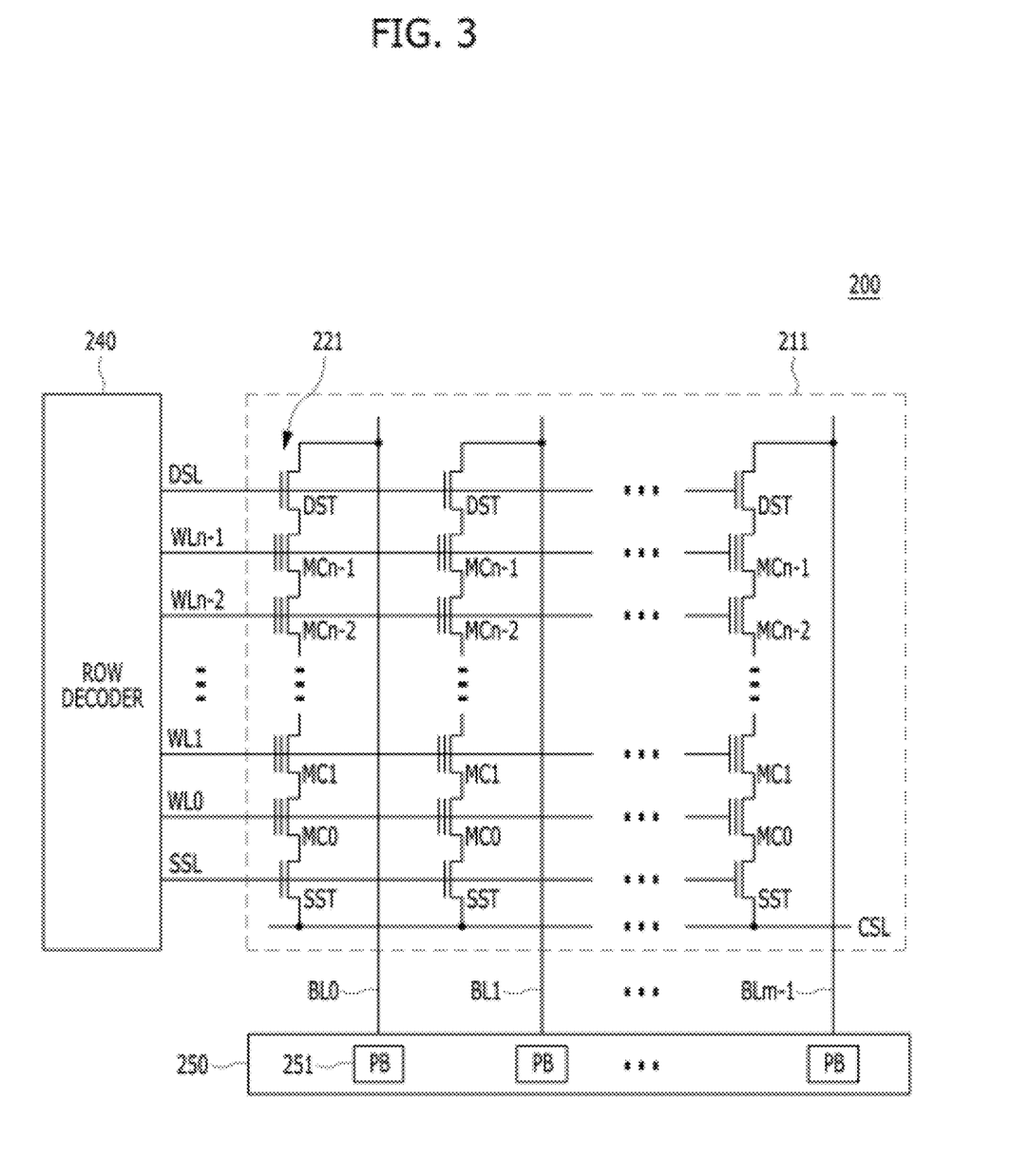
FIG. 3 is a circuit diagram illustrating a memory block of a memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm-1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn-1 may be formed of a multi-level cell (MLC) storing data information of multiple bits in each cell. The cell strings 221 may be electrically coupled to the corresponding bit lines BL0 to BLm-1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Parity based Redundant Array of Inexpensive Disks (hereinafter referred to as "RAID") is used to provide disks failover service in storage systems. It as designed for HDD, while it is widely used for flash memory based storage disk such as Solid State Disk (hereinafter referred to as "SSD") as welt. With the usage of SSD more predictable performance is expected but over time one can witness inconsistency in the performance of the redundant array. The reason is once a disk become occupied with performing a time-consuming task (e.g., garbage collection, random write, etc.) the whole array should wait for that disk to complete its task.

Data is the most valuable asset of today's businesses. RAIDS offer different degrees of disk failure protection by parity calculation, In addition to failover protection, data striping potentially can increase the overall system performance. At the same time, predictable performance is very vital to enterprise flash users, Knowing the worst-case performance for flash users is as important of knowing the average performance, Thus, the invention disclosed herein minimizes the number of undesirable slow read I/O (input/output) while still maintaining the maximum fail-over protection, delivering more predictable performance. For example, in multi-level cell (MLC) SSDs, as opposed to single level cell (SLC) devices, flash modules have less predictable performance, and thus, the invention is beneficial to applications utilizing MLC devices as well. The performance of the SSD is also very workload dependent. The patterns of access, read/write ratio and block size are factors that can impact the performance of an SSD enormously. Thus, the invention disclosed herein utilizes a technique in which the underlying memory system adapts to the workload traffic that the host generates in a dynamic fashion to ensure the maximum latency and performance consistency.

Figure 4:
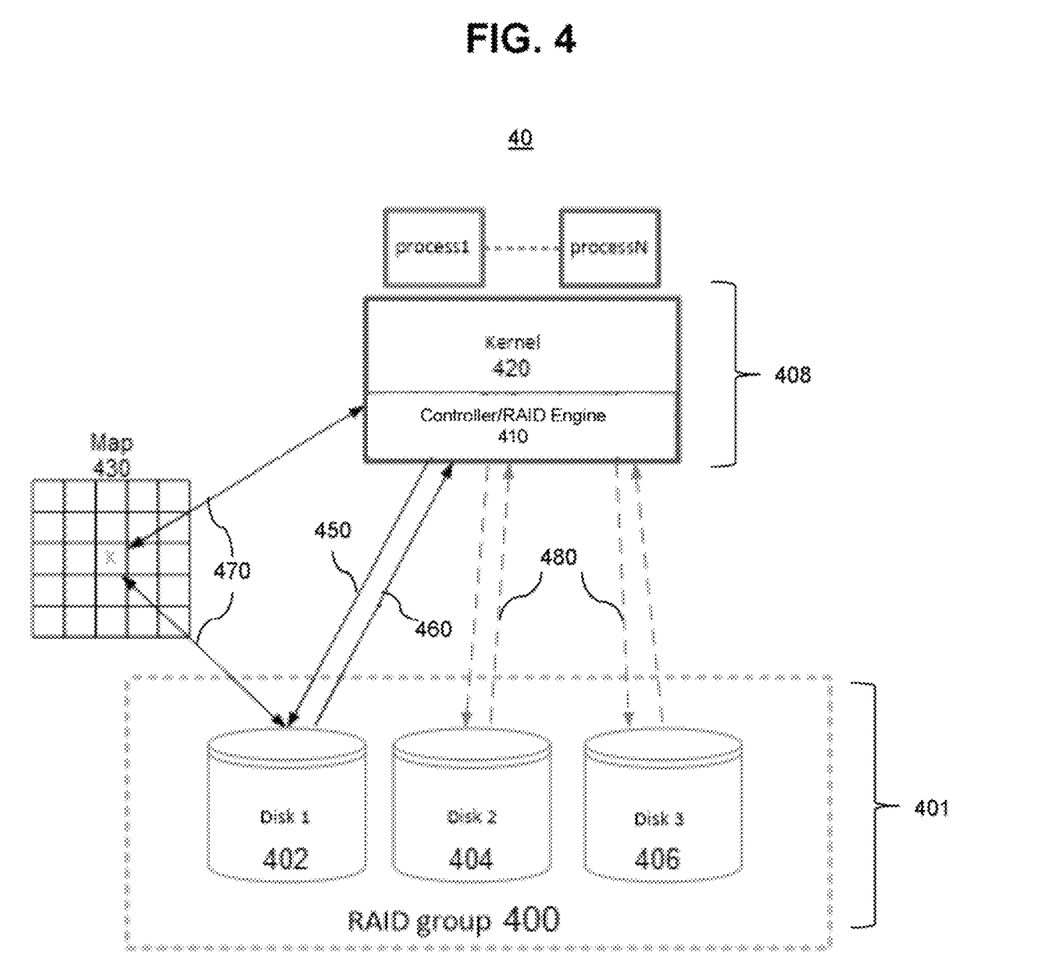
FIG. 4 is a diagram of an example memory system according to aspects of the invention.

Referring to FIG. 4, a diagram of an example system 40 and steps in an example process associated with a read request originating from an arbitrary process that involves access to a RAID group are shown according to aspects of the invention. The system 40 may include a storage access layer 408, a data layout engine 401, and a map 430. The data layout engine may include (or be associated with, connected to, etc.) a RAID group 400, including a plurality of disks 402, 404, and 406. Three disks are shown for simplicity, and those of skill in the art will understand more or fewer disks may be utilized. In an embodiment, the disks may be non-volatile disks (e.g., NVM express, NVMHCI, etc.). The RAID group 400 itself may include multiple flash devices or partitions within one disk, thus, terms like device, member, member device, etc., generally may refer to a flash SSD, a partition in an SSD, and/or other type of memory structure depending on how the RAID scheme is created.

The storage access layer 408 may include a kernel 420 (e.g., operating system, such as linux, windows, etc.) and a controller/RAID engine 410. The controller 410 may be configured as an enhanced RAID engine with I/O latency calculation and dummy read capabilities. The system may also include a map 430 for mapping addresses which will be described below.

At step 450, the RAID engine 410 of a storage server 408 receives a process initiated read request for a set of data (e.g., a file or a range of blocks). The RAID engine 410 can be implemented either in software or hardware of the storage access layer 408 (in FIG. 4 it is shown to be embedded into the storage server access layer). The storage access layer 408 then communicates this information to the data layout engine 401 which accesses the above-mentioned data structure to determine whether any member device in that RAID group 400 possess the data (e.g., determine whether a member device in the RAID group 400 is busy).

At step 460, if the device(s) containing the requested data is/are busy, the data layout engine 401 signals storage access layer 408 to read the requested data from the remaining (not busy) devices in the RAID group. Meanwhile, at step 470, a segment of memory is mapped (e.g., to the map 430) in order to be used by the process to fulfill the read request. At this point, RAID stripping and reconstruction can be employed for the purposes of the disclosed invention. Then, at step 480, RAID data reconstruction techniques supply the portion of the data that was in the busy device to the storage access layer 408.

On the other hand, if the member device containing the requested data is/are not busy, the engine 401 simply signals the storage access layer 408 to read the requested data from the device member that holds the requested data. The data is then returned to the RAID engine 410, which causes the data to be returned to the requesting process. indicated above, the device status (busy/ready) can be tracked and accommodated within the storage access layer 408 rather than the data layout engine 401, and can be done without knowledge of actual hardware status signals from the flash subsystem.

Figure 5:
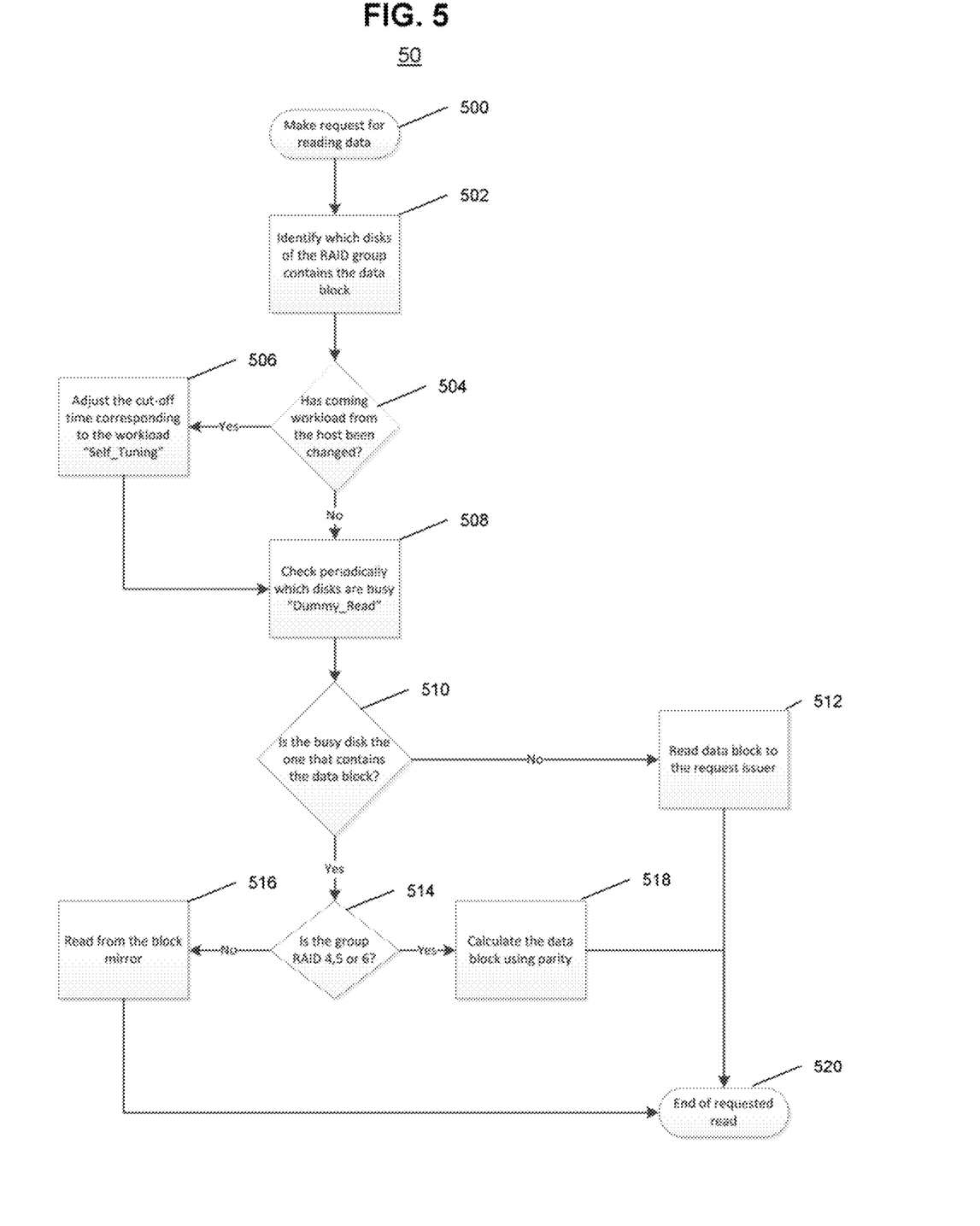
FIG. 5 is a flowchart of steps in a process in accordance with aspects of the invention.

FIG. 5 is a flowchart 50 of steps in a process for a self-tuning RAID device utilizing dummy reads. Although the flowchart 50 shows both steps for dummy reads and steps for self-tuning of the RAID device, both features may be implemented separately, or independently, within a device.

At step 500, a request for reading data is made. For example, the request may be made by the RAID engine 410 as shown in FIG. 4. At step 502, the disks (e.g., devices, memory, etc.) of the RAID group that contains the requested data is identified. As shown in FIG. 4, the disks may be disks 402, 404, 406 of the RAID group 400 within the data access layer 401.

At step 504, it is determined whether the workload coming from the host has been changed. If yes, the process proceeds to step 506, which adjusts the cut-off time corresponding to the workload (e.g., self-tuning). Determining when the underlying device (e.g., memory, device, etc.) is marked as busy depends on the workload that the RAID group is service. This necessitates a careful monitoring of the workload traffic because not every workload should be processed equally. The approach disclosed herein dynamically adjusts the latency threshold at runtime depending on the workload nature. This assures that at runtime the busy memory devices can be consistently detected even if the pattern of the workload changes unexpectedly. Thus, the system may be configured to increase or decrease the latency threshold based on the workflow or change of workflow, For example, the latency threshold may be based on amount of workload received from the host or based on information received during a dummy read as described below. The latency threshold may be based on an amount of time from when the data is requested from the RAID group to when the data is received from the a memory/disk in the RAID group. The latency threshold may also operate as a cut-off time. For example, the latency threshold may be set to an amount of time permitted between requesting data and receiving data.

If the data is not received from the disk within the amount of time specified by the latency threshold, the system determines the disk to be busy and proceeds to access other non-busy disks in the RAID group to construct/calculate the data block.

If no at step 504, or following step 506, the system periodically checks which disks are busy (e.g., a dummy read) at step 508. A dummy read may determine which SSDs (e.g., disks) in an identified RAID group are busy by periodically sending one chunk size read to the RAID members (e.g., a chunk size of 4K bytes in typical operating systems). If the latency for this small chunk read (e.g., dummy read) is going to be higher than expected, then it can be translated as an indication that the device is busy with a time-consuming request/requests (e.g., garbage collection, random write, etc.). At the point that a device member in the RAID group is busy, reading the set of data from the other members in the RAID group starts and follows by constructing the set of data from the data read.

Thus, the dummy read may function as a prodding or poking of a device member to determine whether a disk is busy based on the latency threshold. If the minimal data requested during the dummy read is not received within the amount of time specified by the latency threshold, the disk is determined to be in a busy state.

Therefore, at step 510, when a disk is determined to be busy, it is determined whether the busy disk is the one that contains the requested data block. In some situations, multiple disks may be determined to be busy. Thus if the result of step 510 is no (e.g., the busy disk(s) do not contain the requested data block), the process proceeds to step 512 to read the data block back to the requested issuer from the non-busy disk(s) that contain the requested data block, and the process then ends at step 520.

However, if it is determined that the busy disk does contain the data block the process moves to step 514 where the controller obtains (or attempts to obtain) the data from other non-busy disks in the RAID group. At step 514, it is determined whether other non-busy members of the RAID group (as shown for illustrative purposes, "RAID 4, 5, 6") can be used to perform the request. For example, after the self-tuning stage, if underlying device member that holds the requested data is busy, the RAID engines check with other members to see whether they have the block mirror (step 516) to copy the data or parity calculation (step 518) to construct the data. Once the data has been read from the mirror or otherwise calculated, the process ends at step 520.

As noted above, the RAID functionality applied to a flash array such, as disclosed herein can be implemented in the storage access layer of a storage server. Alternatively, such functionality can be provided by a separate layer or module that is dedicated to providing such functionality to the flash storage. By using a different redundancy algorithm, such as a higher-level RAID, it may be possible to perform a read through data reconstruction even if two or more flash devices in a targeted group are busy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory system, comprising:
   a redundant array of independent disks (RAID) group including a plurality of disks; and
   a storage access layer including a RAID engine, configured to:
   request data from the RAID group;
   identify which disk of the RAID group contains the requested data;
   determine whether a workload from a host has changed, the workload from the host including patterns of access, read/write ratio and block size, wherein when the workload has changed, perform self-tuning by dynamically adjusting, at runtime, a latency threshold which is an amount of time permitted between requesting data and receiving data, wherein the latency threshold is adjusted in response to, and in accordance with, the workload from the host and a dummy read;
   perform the dummy read, in response to the determination of whether the workload changed, to determine which disks in the RAID group are busy by sending a chunk of read data of a known size to each of the plurality of disks in the RAID group and evaluating for each disk the latency for the chunk of read data against an expected latency;
   determine, for each of the plurality of disks in the RAID group, whether or not that disk is non-busy or busy based on the dummy read;
   track the status of each of the plurality of disks in the RAID group in the storage access layer without knowledge of hardware status signals; and
   read the requested data from the disk identified as containing the requested data when that disk is non-busy, and access one or more disks in the RAID group, other than the disk identified as containing the requested data, determined as non-busy by the dummy read, to obtain the requested data either by copying the requested data from a block mirror or by constructing the requested data using a parity calculation when the disk identified as containing the requested data is busy.

2. The memory device of claim 1, wherein the known size is 4K.

3. A method, comprising:
   requesting, with a redundant array of independent disks (RAID) engine, data from a RAID group, the RAID group including the plurality of disks;
   identifying which disk of the RAID group contains the requested data;
   determining whether a workload from a host has changed, the workload from the host including patterns of access, read/write ratio and block size, wherein when the workload has changed, perform self-tuning by dynamically adjusting, at runtime, a latency threshold which is an amount of time permitted between requesting data and receiving data, wherein the latency threshold is adjusted in response to, and in accordance with, the workload from the host and a dummy read;
   performing the dummy read, in response to the determination of whether the workload changed, to determine which disks in the RAID group are busy by sending a chunk of read data of a known size to each of the plurality of disks in the RAID group and evaluating for each disk the latency for the chunk of read data against an expected latency;
   determining, for each of the plurality of disks in the RAID group, whether or not that disk is non-busy or busy based on the dummy read;
   tracking the status of each of the plurality of disks in the RAID group in a storage access layer without knowledge of hardware status signals; and
   reading the requested data from the disk identified as containing the requested data when that disk is non-busy, and accessing one or more disks in the RAID group, other than the disk identified as containing the requested data, determined as non-busy by the dummy read, to obtain the requested data either by copying the requested data from a block mirror or by constructing the requested data using a parity calculation when the disk identified as containing the requested data is busy.

4. The memory device of claim 3, wherein the known size is 4K.

5. A memory device, comprising:
   a redundant array of independent disks (RAID) group including a plurality of disks; and
   a storage access layer including a RAID engine configured to:
   request data from the RAID group;
   identify which disk of the RAID group contains the requested data;
   determine whether a workload from a host has changed, the workload from the host including patterns of access, read/write ratio and block size, wherein when the workload has changed, perform self-tuning by dynamically adjusting, at runtime, a latency threshold which is an amount of time permitted between requesting data and receiving data, wherein the latency threshold is adjusted in response to, and in accordance with, the workload from the host and a dummy read;
   perform the dummy read, in response to the determination of whether the workload changed, to determine which disks in the RAID group are busy by sending a chunk of read data of a known size to each of the plurality of disks in the RAID group and evaluating for each disk the latency for the chunk of read data against an expected latency;
   determine, for each of the plurality of disks in the RAID group, whether or not that disk is non-busy or busy based on the dummy read;
   track the status of each of the plurality of disks in the RAID group in the storage access layer without knowledge of hardware status signals; and
   read the requested data from the disk identified as containing the requested data when that disk is non-busy, and access one or more disks in the RAID group, other than the disk identified as containing the requested data, determined as non-busy by the dummy read, to obtain the requested data either by copying the requested data from a block mirror or by constructing the requested data using a parity calculation when the disk identified as containing the requested data is busy.

6. The memory device of claim 5, wherein the known size is 4K.

* * * * *